US010370093B1

(12) United States Patent
Beckman et al.

(10) Patent No.: US 10,370,093 B1
(45) Date of Patent: Aug. 6, 2019

(54) ON-DEMAND DRONE NOISE MEASUREMENTS

(71) Applicant: Amazon Technologies, Inc., Seattle, WA (US)

(72) Inventors: Brian C. Beckman, Newcastle, WA (US); Eric Berlinberg, Seattle, WA (US); John Raymond Brodie, Seattle, WA (US); Emilia Sorana Buneci, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 434 days.

(21) Appl. No.: 15/353,637

(22) Filed: Nov. 16, 2016

(51) Int. Cl.
*B64C 27/00* (2006.01)
*B64C 39/02* (2006.01)
*G08G 5/00* (2006.01)
*G08G 5/04* (2006.01)
*G08G 5/02* (2006.01)
*G01S 1/74* (2006.01)

(52) U.S. Cl.
CPC .......... *B64C 27/001* (2013.01); *B64C 39/024* (2013.01); *G01S 1/74* (2013.01); *G08G 5/0034* (2013.01); *G08G 5/025* (2013.01); *G08G 5/045* (2013.01); *B64C 2027/004* (2013.01); *B64C 2201/128* (2013.01)

(58) Field of Classification Search
CPC .............. B64C 27/001; B64C 39/024; B64C 2027/004; B64C 2201/128; G01S 1/74; G08G 5/0034; G08G 5/025; G08G 5/045
USPC .......................................................... 701/3
See application file for complete search history.

(56) References Cited

U.S. PATENT DOCUMENTS

| 8,989,924 B2 * | 3/2015 | Seydoux ................ A63H 27/12 244/17.13 |
| 9,731,650 B2 * | 8/2017 | Gee ........................ B60Q 5/008 |
| 9,944,366 B2 * | 4/2018 | Tang ........................ B63C 9/01 |
| 2003/0034883 A1 * | 2/2003 | Sato .................... G01S 7/52004 340/435 |
| 2006/0158329 A1 | 7/2006 | Burkley et al. |
| 2007/0103292 A1 | 5/2007 | Burkley et al. |

(Continued)

OTHER PUBLICATIONS

U.S. Appl. No. 15/194,258, filed Jun. 27, 2016, Titled: Drone Noise Reduction.

(Continued)

*Primary Examiner* — Anne M Antonucci
*Assistant Examiner* — James E Stroud
(74) *Attorney, Agent, or Firm* — Kilpatrick Townsend & Stockton LLP

(57) ABSTRACT

Techniques for calculating a sound received at a plurality of distances from an unmanned aerial vehicle (UAV) may be provided. For example, during delivery, the UAV may be associated with a sensor to obtain first sound information that corresponds to the sound generated by the UAV. A sensor associated with a landing marker may obtain second sound information about the sound generated by the UAV during flight and delivery of a payload to a location associated with the landing marker. In embodiments, the first sound information and the second sound information may be utilized to calculate sound metrics for the sound generated by the UAV and determine the sound received at a plurality of distances from the UAV during flight.

20 Claims, 9 Drawing Sheets

(56) References Cited

U.S. PATENT DOCUMENTS

| | | | |
|---|---|---|---|
| 2010/0220552 A1* | 9/2010 | Owaki | G01S 3/8083 367/127 |
| 2012/0097801 A1 | 4/2012 | Barrett et al. | |
| 2013/0056581 A1 | 3/2013 | Sparks | |
| 2013/0065681 A1* | 3/2013 | Olomskiy | A63F 13/12 463/31 |
| 2013/0328701 A1* | 12/2013 | Sato | G01S 3/808 340/943 |
| 2014/0180914 A1* | 6/2014 | Abhyanker | G01C 1/00 705/39 |
| 2015/0000252 A1 | 1/2015 | Moore et al. | |
| 2015/0056058 A1* | 2/2015 | Grissom | F04D 29/665 415/1 |
| 2015/0203031 A1* | 7/2015 | Arita | B60Q 5/008 340/903 |
| 2015/0331095 A1* | 11/2015 | Sato | G01S 11/14 381/56 |
| 2016/0063987 A1* | 3/2016 | Xu | B64C 39/024 381/71.12 |
| 2016/0068267 A1 | 3/2016 | Liu et al. | |
| 2016/0083073 A1 | 3/2016 | Beckman | |
| 2016/0107751 A1 | 4/2016 | D'andrea et al. | |
| 2016/0125746 A1 | 5/2016 | Kunzi et al. | |
| 2016/0189732 A1 | 6/2016 | Hearing et al. | |
| 2016/0241767 A1 | 8/2016 | Cho et al. | |
| 2016/0258758 A1 | 9/2016 | Houston et al. | |
| 2016/0340006 A1* | 11/2016 | Tang | B63C 9/01 |
| 2017/0148328 A1* | 5/2017 | Chan | G08G 5/006 |
| 2017/0148467 A1 | 5/2017 | Franklin et al. | |
| 2017/0174317 A1* | 6/2017 | Beckman | B64C 11/00 |
| 2018/0068567 A1* | 3/2018 | Gong | H04W 4/022 |
| 2018/0105270 A1 | 4/2018 | Xu et al. | |
| 2018/0259613 A1* | 9/2018 | Hirata | G01S 3/808 |

OTHER PUBLICATIONS

U.S. Appl. No. 15/194,317, filed Jun. 27, 2016, Titled: Propeller Sound Alteration for a Drone.

U.S. Appl. No. 15/230,223, filed Aug. 5, 2016, Titled: Static Inverse Desymmetrized Propellers.

U.S. Appl. No. 15/255,098, filed Sep. 1, 2016, Titled: Drone Noise Reduction via Simultaneous Propeller Modulation.

U.S. Appl. No. 14/975,265, filed Dec. 18, 2015, Titled: Propeller Blade Leading Edge Serrations for Improved Sound Control.

Yoon et al., "Advanced Sound Capturing Method With Adaptive Noise Reduction System for Broadcasting Multi Copters", 2015 IEEE International Conference on Consumer Electronics (ICCE), IEEE (Jan. 9, 2015), pp. 26-29.

* cited by examiner

ON-DEMAND DRONE NOISE MEASUREMENTS

CROSS-REFERENCES TO RELATED APPLICATIONS

This application is related to and incorporates by reference for all purposes the disclosures of U.S. patent application Ser. No. 15/194,317 filed Jun. 27, 2016, entitled "PROPELLER SOUND ALTERATION FOR A DRONE"; U.S. patent application Ser. No. 15/230,223 filed Aug. 5, 2016, entitled "STATIC INVERSE DESYMMETRIZED PROPELLERS"; U.S. patent application Ser. No. 15/255,098 filed Sep. 1, 2016, entitled "DRONE NOISE REDUCTION VIA SIMULTANEOUS PROPELLER MODULATION"; and U.S. patent application Ser. No. 15/194,258 filed Jun. 27, 2016, entitled "DRONE NOISE REDUCTION".

BACKGROUND

More and more users are turning to network-based resources, such as electronic marketplaces, to purchase items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

Typically, a user (e.g., a customer) may operate a computing device to access a network-based resource and request information about an item. The network-based resource may provide the information and information about an available delivery method. In turn, the user may purchase the item from the network-based resource and specify a delivery location. The item may be accordingly delivered to the delivery location. The network-based resource may provide an option to deliver the item to the delivery location via an unmanned aerial vehicle (UAV) thus increasing traffic and noise levels near the delivery location.

BRIEF DESCRIPTION OF THE DRAWINGS

Various embodiments in accordance with the present disclosure will be described with reference to the drawings, in which.

DETAILED DESCRIPTION

Figure 1:
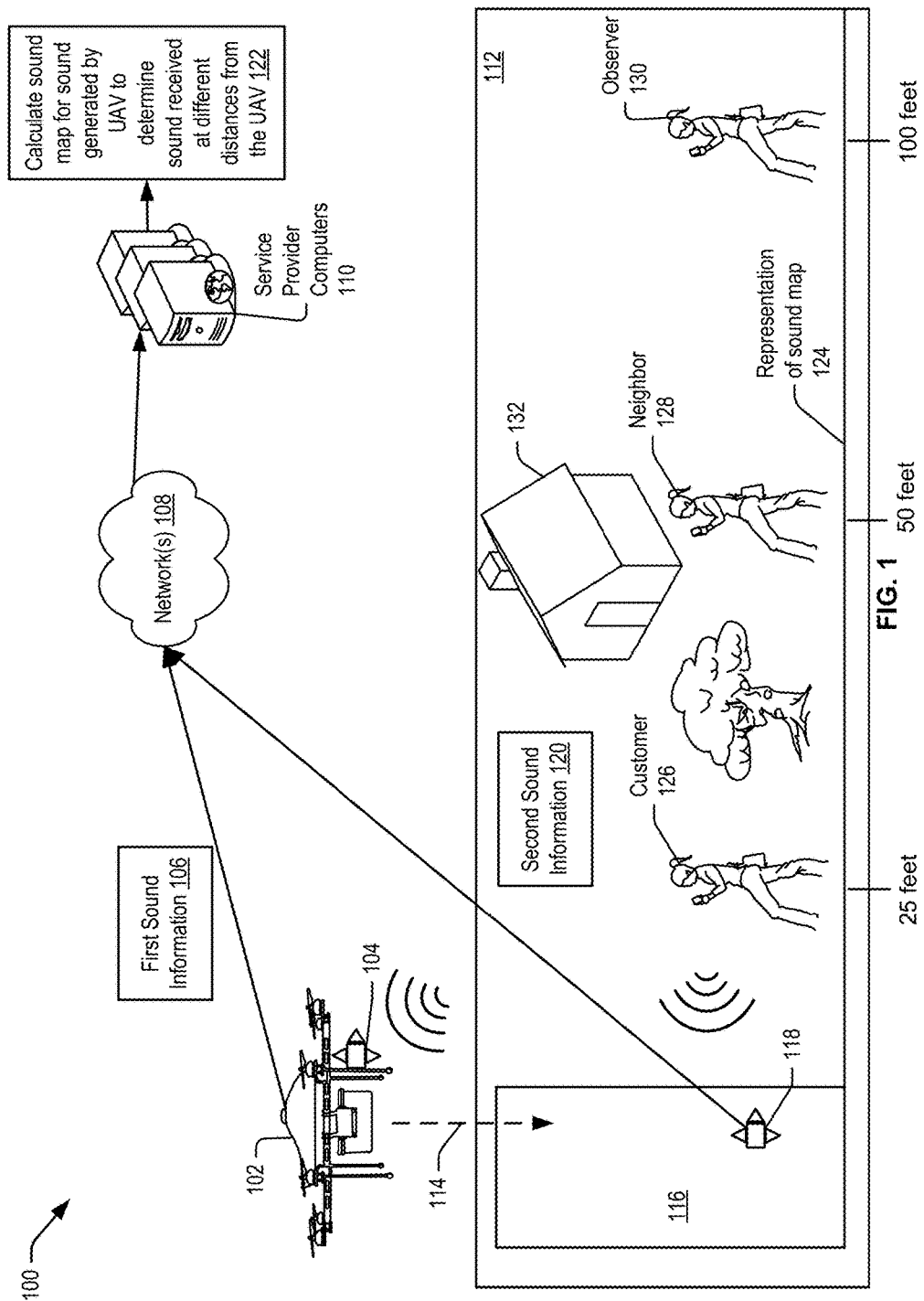
FIG. 1 illustrates an example environment for a sound determination feature associated with a UAV during flight, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, obtaining the sound generated by an unmanned aerial vehicle (UAV) during delivery, pick-up, or transfer of a payload at a location to determine a sound power level, sound pressure level, or other sound metrics received and/or heard at different distances from the UAV. In particular, a UAV may be configured to utilize one or more sensors and/or sound sensors to obtain sound information about the sound generated by the UAV during flight while delivering, picking-up, or transferring an item at or to a location. In some embodiments, the one or more sensors and/or sound sensors obtain sound information about the sound generated by the UAV during flight and landing at a location absent a delivery, pick-up, or transfer of an item or payload at the location. A service computer implementing sound determination features described herein may utilize the sound information to calculate or determine the sound heard or received at different distances from the UAV given the sound being generated by the UAV. During flight and delivery of a payload a UAV may generate a sound that exceeds sound regulations or user preferences. As such, a sound determination feature described herein can dynamically determine the sound power level or sound pressure level received at different distances from the UAV given the current sound being produced by the UAV during flight and subsequent instructions to modify or alter the sound generated by the UAV may be generated and transmitted. In accordance with at least one embodiment, to adhere to sound regulations or preferences, instructions to move a landing marker at a delivery location may be generated and transmitted to a user device of a customer. The instructions may identify a new location or position for the landing marker that will, given the current sound being produced by the UAV, avoid violating sound regulations or preferences.

In a non-limiting example, a service provider computer may receive an order for an item that is to be delivered by a UAV to a customer's location. The service provider computer may dispatch a UAV to deliver the item and transmit a flight path to the delivery location. During flight, a first sensor associated with the UAV, may capture first sound information that includes sounds generated by the UAV during flight. Upon approach or arriving at the delivery location a second sound sensor associated with a landing marker of the delivery location may capture second sound information about the sounds generated by the UAV during flight and delivery. The first and second sound information may be transmitted to the service provider computer via available networks. In response to receiving or obtaining the first and second sound information, the service provider computer may extract sound metrics for the sound generated by the UAV and determine a sound map for the sound generated by the UAV and/or for the delivery location. The sound map may identify the sound power level or sound pressure level at various distances from the UAV given the sound being generated by the UAV as captured in the first and second sound information. For example, the sound map may identify the sound power level and/or pressure received at a distance of 25 feet, 50 feet, and a 100 feet from the UAV given the sound metrics extracted from the sound information. Instructions may be generated to alter a flight path, modulate the set of propellers, or move the landing marker to a different location within the delivery location to alter the sound generated by the UAV or adhere to sound regulations and preferences.

In embodiments, the service provider computer may maintain one or more thresholds or preferences for the sound metrics, sound power level, or sound pressure level of the sound generated by a UAV during flight. For example, a user may identify that the sound power level of a UAV delivering an item to their location should not exceed a certain threshold. In response to calculating a sound map for the sound generated by the UAV, other instructions, such as modulation of propeller instructions, may be generated and transmitted to the UAV to adhere to such regulations, thresholds, or preferences. In some embodiments, a sound sensor associated with the UAV may continuously record the sound information about the sound generated by the UAV during flight. In some embodiments, the sound sensor associated with the UAV may periodically record the sound information or being capturing the sound information upon receiving a signal or instructions from the service provider computer. For example, the geo-location information for a delivery location may be compared to the current geo-location information for a UAV delivering an item to trigger the capturing of sound information for the UAV (i.e., proximity to the delivery location triggers the recording or capturing of the sound information). Other suitable signals may trigger the capturing of sound information by the sensor associated with the UAV and/or the sensor associated with a landing marker of a delivery location such as near field communication (NFC) signals, Bluetooth, wireless, or radio signals. An appropriate signal transmitter and receiver may be associated with each component in embodiments such as the UAV and/or landing marker to enable periodic capturing of the sound generated by a UAV during flight.

Sound maps determined or calculated for UAVs during flight can be utilized to modulate one or more sets of propellers of a UAV, that may be modulating at different rotational speeds, to generate an expected sound which may be a more pleasurable sound for nearby users and adhere to sound regulations, thresholds, or preferences specified by a user, a government entity, or other entity. In some embodiments, other variations and/or treatments to the propellers themselves may be implemented to reduce and/or alter the sound generated by the UAV during flight. For example, a propeller blade may include propeller blade treatments along one or more portions of the propeller blade (e.g., blade treatments along the leading edge of the propeller blade). Each propeller blade set, may be composed of different materials or have other surface treatments such as indentations, pores, etc. In some embodiments, a set of propeller blades may be angled at a certain angle with respect to the UAV to provide different types of control and movement during propulsion of the UAV. Some propeller blades may include treatments for reducing noise which can be activated via a propeller blade treatment adjustment controller that retracts and/or extends one or more of the propeller blade treatments. Other propeller blade treatments, compositions, or angle variations are included in the current disclosure and as described in U.S. patent application Ser. No. 14/975,265, filed Dec. 18, 2015, entitled, "PROPELLER BLADE LEADING EDGE SERRATIONS FOR IMPROVED SOUND CONTROL", which is herein incorporated by reference. In some embodiments, the rotational speed of the propeller blades may be adjusted to reduce and/or alter the sound generated by the UAV during flight to adhere to the sound preferences of a user and based in part on the sound map generated from the sound metrics as described herein.

In embodiments, one or more sensors may be associated or positioned on the UAV to capture sound generated by or around the UAV during delivery of an item or payload, and while in flight. In embodiments, the captured sounds can be utilized to generate a sound map that identifies a particular decibel level, sound power level, sound pressure level, or other sound metrics received at different distances from the UAV during flight. For example, a sound map may identify the decibel level, loudness, sharpness, roughness, fluctuation strength, and tonal prominence of the sound received at a certain distance from the UAV at any given time based on the sound captured by the one or more sensors. The sound map may calculate the predicted sound levels, metrics, pressure, etc., based on the sound being generated by the UAV as identified in the sound information. Each metric included in the sound map may be compared to one or more thresholds that correspond to the portion of the flight for delivery of an item to determine if the sound generated by the UAV should be reduced or altered. For example, one threshold that tolerates a large amount of noise may be utilized during a transit mode whereas another threshold that identifies a small amount of noise may be utilized during a different portion of the flight such as delivery or take off.

In some embodiments, a service provider computer in communication with the UAV or a computer system of the UAV may extract sound metrics from the captured sound information and generate a sound map for the UAV or for a particular location. In some embodiments, the sound maps may be utilized to provide instructions to the UAV and associated components which result in the modulation of the sets of propellers of the UAV or the generation and transmission of instructions to a user device to move the location of a landing marker. In some embodiments, the sound information can be utilized by an operator or object avoidance algorithm to identify the presence of an object in a landing marker and/or avoid a collision with an object, person, or other UAV during flight and delivery of a payload. For example, an operator of a semi-autonomously controlled UAV may utilize a camera or video feed sensor to identify a delivery location and guide or pilot the UAV to deliver the item. However, the sound information provided to the operator may identify a sound of an object or entity, such as a dog barking, that is not visible via the camera or video feed. The operator may utilize the sound information captured by the UAV's sound sensors to avoid colliding with the dog, identify the dog's location relative to the landing marker, and instruct a nearby user to remove the dog and avoid collision and successful delivery of the payload.

In various embodiments, the sound maps may be utilized to provide instructions to the UAV and associated components which result in the modulation of each set of different sized, treated, or other blade treated propellers thereby utilizing each set of propellers simultaneously to generate an expected sound. As used herein, to modulate or modulation includes altering or changing the RPMs of a corresponding propeller blade including a complete transition (start/stop) from a first propeller to a second propeller. In some embodiments, one or more sensors may be associated with the UAV and configured to emit and receive a signal that identifies sound propagation characteristics of an environment around the UAV during delivery. For example, the one or more sensors may be configured to emit and receive a signal within a certain distance around the UAV during delivery (i.e., anywhere from 5 to 20 meters from the UAV). In some embodiments, the sound propagation characteristics can be utilized to update and or generate one or more sound maps for the sound generated by the UAV or for a particular location. In some embodiments, the sound information may be utilized to identify a component failure of the UAV, such as a motor failure and/or performance metrics associated with the various components of the UAV including the motors and propellers.

Instructions may be generated and transmitted and/or utilized by the UAV to modulate from a first set of propellers to a second set of propellers to prevent an unexpected de-acceleration of the UAV during delivery based on the sound information that identifies component failure or performance metrics. In some embodiments, users who initially ordered the item for delivery and nearby neighbors may provide input, or be requested for input, regarding the relative noise level or sound generated by the UAV during a delivery. The input provided by the users can be utilized to dynamically update the sound maps and updated instructions may be provided to update the modulation of the propellers, to ascend or descend to a new or different altitude in order to alter the sound generated by the UAV. In some embodiments, users or customers may capture sound information about the sounds generated by the UAV utilizing an associated user device, such as a mobile phone or tablet computer. The sound information captured by a user device may be transmitted to the service provider computers and/or UAV and utilized to update sound maps. Pre-generated sound maps may be updated using the user input for subsequent deliveries to the same delivery location or destination. In some embodiments, flight plans may be updated or altered utilizing the sound maps generated for the sound produced by the UAV or for a particular delivery location. For example, the sound map may identify that the sounds being generated by the UAV would violate sound or noise regulations at a first altitude but not at a second altitude when flying to or from a delivery location. As such, a corresponding flight plan may instruct the UAV to ascend or descend accordingly to adhere to sound regulations and deliver a payload promptly to a delivery location.

In some implementations, sound information may be recorded/captured by sensors/sound sensors along with and/or independently of other operational and/or environmental data. Such information or data may include, but is not limited to, extrinsic information or data, e.g., information or data not directly relating to the unmanned aerial vehicle, or intrinsic information or data, e.g., information or data relating to the unmanned aerial vehicle itself. For example, extrinsic information or data may include, but is not limited to, environmental conditions (e.g., temperature, pressure, humidity, wind speed, and wind direction), times of day or days of a week, month or year when an unmanned aerial vehicle is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) tracked positions (e.g., latitudes and/or longitudes) of the unmanned aerial vehicles, or status of package delivered.

In accordance with the present disclosure, the amount, the type and the variety of information or data that may be captured and collected regarding the physical or operational environments in which unmanned aerial vehicles are operating and correlated with information or data regarding measured sounds is theoretically unbounded. In some embodiments, an indication or information may identify that the UAV has successfully delivered an item to a delivery location. This data point can also be utilized to modulate between propeller sets as less lift, power, and/or propulsion may be required to fly and return the UAV to an origin location (a related facility) and thus the sound generated by the UAV may be further altered and/or reduced according to calculated sound maps. In some embodiments, data regarding the payload such as weight, size, packaging, weight distribution, and sound characteristics associated with the item and item packaging may be utilized as a data point when identifying sound maps for use by the management module to generate modulation instructions, flight plans, or user instructions.

The sound information, including both extrinsic and intrinsic data about the UAV during flight, may be used to train a machine learning system to extract sound metrics and calculate sound maps for a UAV's operations or locations, or conditions in such locations, with sounds generated by the unmanned aerial vehicle. The trained machine learning system, or a sound map developed using such a trained machine learning system, may then be used to predict sounds heard or received at different distances from the UAV when a UAV operates in a particular location, or subject to a predetermined set of conditions, at given velocities or positions, or in accordance with any other characteristics (such as utilizing a set of propellers of a certain size that is different from another set of propellers of a different size).

Although some of the examples described herein use a cable to deliver the package or payload to a location, the embodiments herein are not limited as such. Instead, the UAV may deliver the package to the location by landing on a surface or may delivery the package by releasing the package from a certain height above the location and utilize a parachute mechanism that is coupled to the package to complete delivery.

In the interest of clarity of explanation, the embodiments may be described herein in the context of a UAV delivering a package containing an item ordered from a network-based resource, where the delivery may include lowering the package using a cable. However, the embodiments are not limited as such. Instead, the embodiments may similarly apply to one or more UAVs, each or a collection thereof delivering one/or more payloads. Generally, the delivering may include using one or more tethers, such as one or more cables of the same or of different types, to lower the one or more payloads and releasing the one or more tethers causing the one or more payloads to be delivered. Releasing a tether from a UAV may include severing the tether or decoupling, without severing, the tether from the UAV.

Turning to FIG. 1, FIG. 1 illustrates an example environment for a sound determination feature associated with a UAV during flight, according to embodiments. FIG. 1 depicts environment 100 that includes a UAV 102 and associated first sound sensor 104 capturing first sound information 106 and transmitting the first sound information 106, via networks 108, to service provider computers 110.

As described herein, the first sound sensor 104 may be configured to continuously record or capture the first sound information 106 during flight of the UAV 102, periodically, or upon approach to the delivery location 112. As illustrated in FIG. 1, the UAV 102 may be capture and transmit the first sound information 106 during delivery 114 of an item to the delivery location 112. In accordance with at least one embodiment, the delivery location 112 may be associated with a landing marker 116 that can be utilized to guide or aid in the delivery of the payload by the UAV 102 to the delivery location 112.

As depicted in FIG. 1, the landing marker 116 may include a corresponding second sound sensor 118 that is configured to capture or obtain second sound information 120 and transmit the second sound information 120, via networks 108, to the service provider computers 110. In accordance with at least one embodiment, the UAV 102 may be configured to store the first sound information 106 and second sound information 120 in local databases, memory, or storage for later transfer to the service provider computers 110 upon returning to an origination location such as a facility associated with the service provider computers 110 or an electronic marketplace. In embodiments, the service provider computers 110 may utilize the first sound information 106 and second sound information 120 to extract sound metrics from the sound generated by the UAV 102 during flight and calculate a sound map 122.

As described herein, the sound map 122 may calculate predicted sound power level, sound pressure level, or other sound metrics heard or received at one or more distances from the UAV 102 given the sounds being generated by the UAV 102 during flight that are derived from the first sound information 106 and second sound information 120 as captured by first sound sensor 104 and second sound sensor 118. FIG. 1 includes a visual representation of the sound map 124 that calculates the sound power level or sound pressure level heard/received by a customer 126 that is 25 feet from the UAV 102, a neighbor 128 that is 50 feet from the UAV 102, and by an observer 130 that is 100 feet from the UAV. In accordance with at least one embodiment, the sound map may account for objects, such as a house 132 in the delivery location 112, as sound propagates, transforms, or travels differently given a number of interceding objects in a given location. In some embodiments, the UAV 102 may be configured to utilize a video sensor (not pictured) to provide supplemental video or image data that can be used to alter or update the calculation and determination of the sound map 122 for the delivery location 112 by identifying objects or environmental conditions which may affect the predicted sounds heard or received at different distances from the UAV 102. As described herein, the calculation of the sound map 122 for the delivery location 112 and UAV 102 can be utilized to adhere to certain sound regulations, thresholds, or user preferences for the delivery location 112. For example, the calculated sound received by customer 126 may violate a user preferences as determined by the service provider computers 110. In response to this determination, instructions may be generated by the service provider computers 110 and transmitted, via networks 108, to UAV 102 to alter modulation of an associated set of propellers that results in altering the sound generated by the UAV 102 to adhere to the user preferences.

Figure 2:
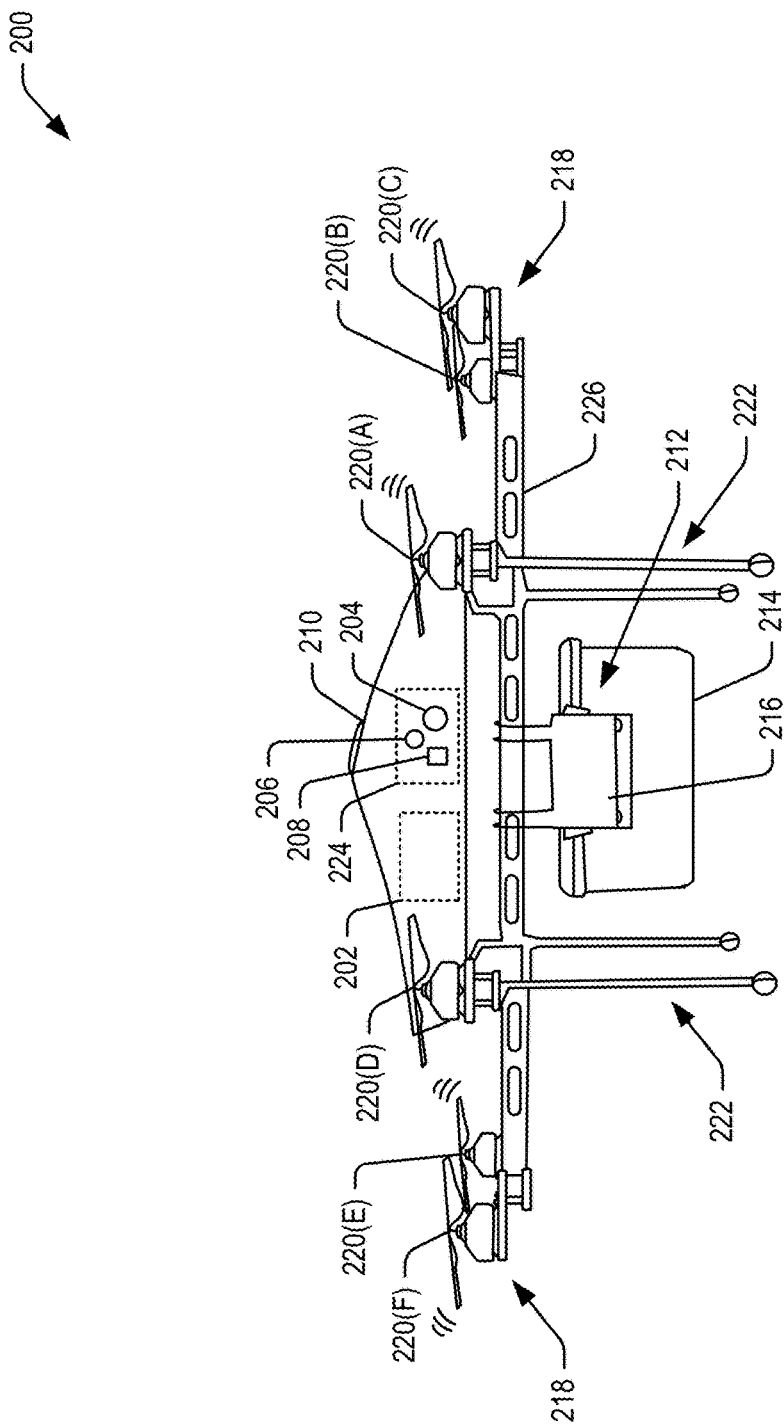
FIG. 2 illustrates an example unmanned aerial vehicle configured to deliver an item, according to embodiments.

Example components of a UAV, such as the UAV 102, configured to deliver a payload/item to a location and determine a sound map for the sound generated by the UAV 102 are further illustrated in FIG. 2. This UAV may use a cable as a part of the delivery approach. The cable may be added (e.g., installed, loaded, attached, coupled, connected) to the UAV as a part of deploying the UAV on the delivery mission. This UAV may use different configurations of sets of propellers of different sizes to deliver the item to the delivery location.

FIG. 2 illustrates an example unmanned aerial vehicle configured to deliver an item, according to embodiments. In FIG. 2, an example UAV 200 configured to deliver an item is illustrated. The UAV 200 may be designed in accordance with commercial aviation standards and may include multiple redundancies to ensure reliability. In particular, the UAV 200 may include a plurality of systems or subsystems operating under the control of, or at least partly under the control of, a management component 202. The management component 202 may be configured to mechanically and/or electronically manage and/or control various operations of other components of the UAV 200. For example, the management component 202 may include various sensing, activating, and monitoring mechanisms to manage and control the various operations. For instance, the management component 202 may include or interface with an onboard computing system 204 hosting a management module for autonomously or semi-autonomously controlling and managing various operations of the UAV 200 and, in some examples, for enabling remote control by a pilot. The various operations may also include managing other components of the UAV 200, such as a propulsion system 218 to facilitate flights, a payload holding mechanism 212 to facilitate holding a payload (e.g., a package), and/or a payload releasing mechanism 214 to facilitate release and delivery of the payload. Portions of the management component 202, including mechanical and/or electronic control mechanisms may be housed under the top cover 210 or distributed within other components such as the payload holding mechanism 212 and the payload releasing mechanism 214. In a further example, components remote from the UAV 200 may be deployed and may be in communication with the management component 202 to direct some or all of the operations of the management component 202. These remote components may also be referred to as a management component. In an example, the management component 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), and radio-frequency identification (RFID) capability (not shown).

The UAV 200 may also include the onboard computing system 204. In an example, the computing system 204 may be integrated with the management component 202. In another example, the computing system 204 may be separate from but may interface with the management component 202. The computing system 204 may be configured to provide an electronic control of various operations of the UAV 200, including the ones provided by the management module. In an example, the computing system 204 may also process sensed data by one or more other components of the UAV, such as the management component 200, to generate data associated with a delivery surface. In a further example, the computing system 204 may also electronically control components of the payload holding mechanism 212 and/or the payload releasing mechanism 214. In another example, the computing system 204 may also electronically control components of the UAV 200 such as a plurality of propulsion devices, a few of which, 230(A)-230(F) are included in FIG. 2. The management component 202 and computing system 204 may be configured to alter the usage, modulation, and rotational speed of the propellers of the propulsion devices 230(A)-230(F) to reduce and/or alter the noise generated by the UAV 200 as described herein. In embodiments, the propellers of the propulsion devices 230(A)-230(F) may be of various and different sizes from one another (such as varied length, width, or any other suitable dimensional combination to enable a difference between propeller sizes) and or comprise various propeller blade treatments. As illustrated in FIG. 2, the computing system 204 may be housed within the top cover 210 and may include a number of components, such as a computer 206, a storage device 208, and an interface 224. The computer 206 may host the management module configured to provide management operations of the flight and/or other portions of a mission of the UAV 200. In embodiments, the UAV 200, computer 206, and management component 202 may be configured to operate and utilize one or more sound sensors (not shown) for obtaining sound generated by UAV 200 during flight or for obtaining sound from one or more other UAVs within a certain distance of UAV 200 during corresponding flights. For example, the management component 202 and computer 206 may autonomously or semi-autonomously turn on or begin recording/obtaining sound information about the sound generated by UAV 200 according to external or internal stimuli or based on instructions from an external source. For example, the management module may generate the data associated with the sound generated by or around the UAV 200, extract sound metrics from sound information about the sound generated by the UAV 200, determine sound power levels for a plurality of distances from the UAV, direct the modulation of the different sets of propellers of different sizes, determine an appropriate delivery surface, generate instructions to move an object detected in a landing zone or to move the landing zone itself, determine a distance by which to lower a payload, a speed of lowering the payload, direct the propulsion system to position the UAV 200 according to this data, activate a release of a package from the payload holding mechanism 212, activate a release of a cable, and/or activate other functions of the mission, and continue to modulate the sets of propellers during various portions of the mission to deliver the payload and/or avoid obstacles and objects. The storage device 208 may represent one or more storage media, such as a volatile or non-volatile semiconductor, magnetic, or optical storage media. In an example, the storage device 208 may be configured to store any operational data of the UAV 200, extrinsic or intrinsic sound data obtained by sensors associated with the UAV 200 regarding sound generated by or around the UAV 200, generated or received data associated with the delivery surface, received data from a sound sensor associated with a landing marker, received data from a user device, and/or received data associated with a delivery location. The data may include the distance by which the payload may be lowered and the lowering speed. In addition, the storage device 208 may store a set of rules associated with lowering and releasing the payload. This set of rules may specify parameters to determine, where, when, and/or how to deliver the payload such that a likelihood of damaging the payload (or content thereof) and/or interference with the UAV 200 may be reduced. The set of rules may also specify parameters to determine appropriate sound levels regarding metrics included in sound information obtained about the sound generated by the UAV 200 (loudness, fluctuation strength, etc.,). In embodiments, the set of rules may specify thresholds for certain sound parameters such that instructions may be generated to modulate the set of associated propellers for UAV 200 to reduce or alter the sound generated by UAV 200. In some embodiments, the set of rules may specify conditions for periodically recording or obtaining sound information from a sound sensor associated with the UAV. The computer 206 (e.g., the management module) may monitor and/or determine some or all of the parameters and accordingly generate the distance and/or the speed for delivery and determine the modulation with corresponding rotational speed to utilize for associated propellers of UAV 200 to reduce and/or alter sound generated by the UAV 200. In some embodiments, the computer 206 (e.g., the management module) may generate instructions for deploying particular propeller treatments for reducing and/or altering sound generated during flight of the UAV 200. In embodiments, the computer 206 (e.g., the management module) may generate instructions for periodically recording or obtaining sound information that corresponds to the sound generated by the UAV 200 during flight. The modulation of the sets of propellers and/or deployment/retraction of propeller treatments may be electronically or mechanically controlled. The interface 224 may represent an interface for exchanging data as part of managing and/or controlling some of the operations of the UAV 200. In an example, the interface 224 may be configured to facilitate data exchanges with the management component 202, other components of the UAV 200, and/or other components remote from the UAV 200. As such, the interface 224 may include high speed interfaces, wired and/or wireless, serial and/or parallel, to enable fast upload and download of data to and from the computing system 204.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms. As illustrated in FIG. 2, the payload holding mechanism 212 may include a compartment configured to contain the payload. In another example, the payload holding mechanism 212 may include two opposing arms configured to apply friction to the payload. The management component 202 may be configured to control at least a portion of the payload holding mechanism 212. For example, the management component 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 214 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s) of the UAV 200. For example, the cable may be coiled around the winch or spool or may be stowed or coiled inside the compartment (if one is used as part of the payload holding mechanism 212). The cable may have a configuration selected based on the mission of the UAV 200, the mass of the payload, and/or an expected environment associated with the delivery location (e.g., the potential interference).

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been traveled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management component 202. In some examples, the propulsion system 218 may be configured to adjust itself without receiving instructions from the management component 202. Thus, the propulsion system 218 may operate semi-autonomously or autonomously. In some embodiments, the propulsion system 218 may, in conjunction from instructions from the management module, dynamically modulate between the different sets of propellers to reduce and/or alter the sound generated by UAV 200.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Hence, a UAV, similar to the UAV 200, may be deployed on a mission to, for example, deliver a payload, by modulating between and or utilizing simultaneously sets of propellers. The UAV may autonomously or semi-autonomously complete or perform a portion of the mission. For example, coordinates of a delivery location may be provided to the UAV. The UAV may hold the payload in a payload holding mechanism and fly to the delivery location. Further, the UAV may utilize a portion of the one or more sets of propellers to propel the UAV and generate an expected sound or sound level during delivery. The UAV and associated sensors may obtain or record sound information about the sound generated by the UAV during flight. Upon arrival to the location, the UAV may sense or obtain data from one or more sensors to extract sound metrics for the sound generated by the UAV, generate a sound map for the sound generated by the UAV, modify the configuration/modulation from a first set of propellers to a second set of propellers (either exclusively or simultaneously) to alter and/or reduce the noise generated by the UAV, and/or generate instructions for avoid an object or moving a landing marker to facilitate completion of the delivery mission. Accordingly, the UAV may release the payload from the payload holding mechanism. The UAV may again modulate and modify the sets of propellers to gain altitude and begin the return trip to an origin location or facility from which it deployed.

Figure 3:
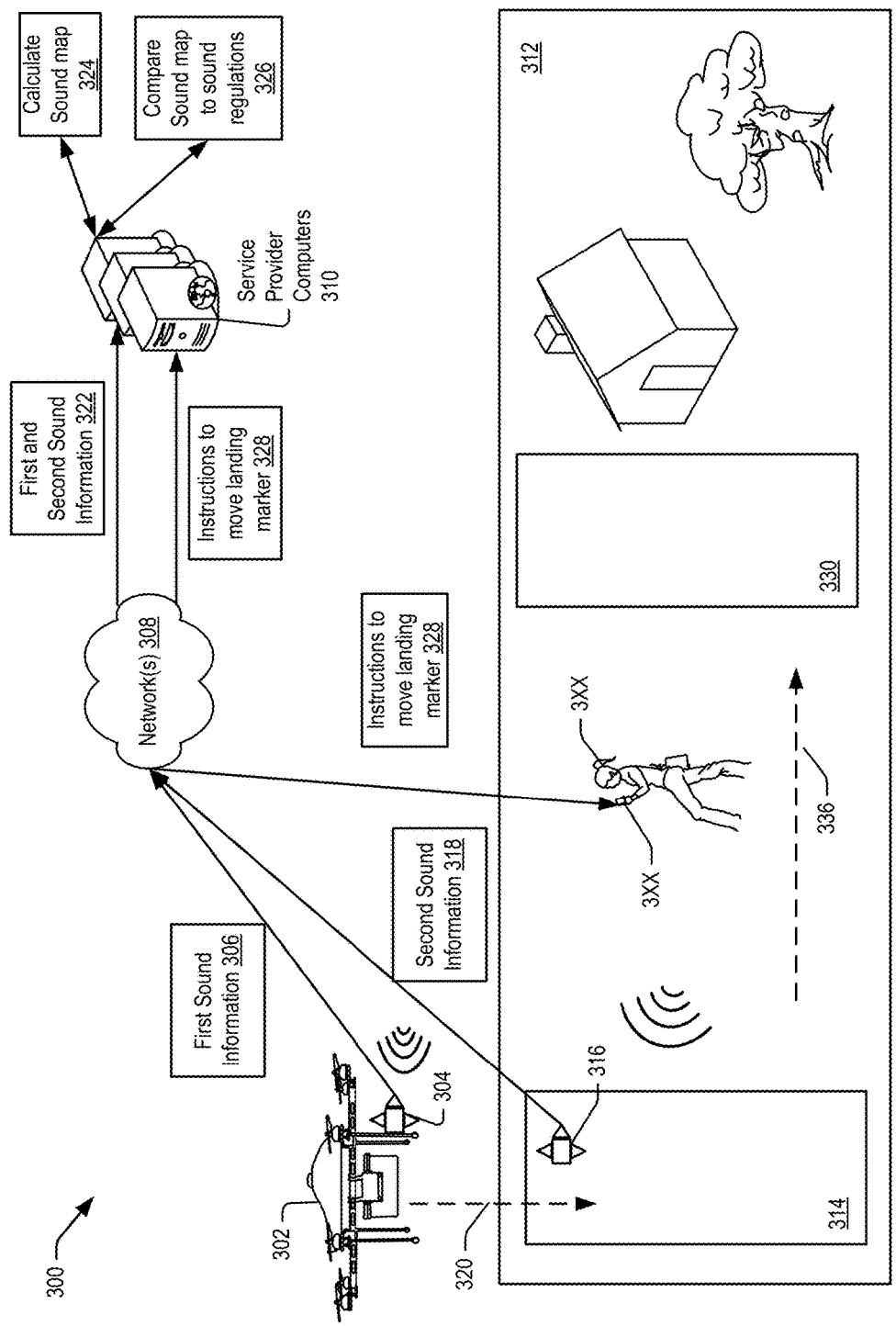
FIG. 3 illustrates example approaches for moving a landing marker associated with a sound determination feature, according to embodiments.

FIG. 3 illustrates example approaches for moving a landing marker associated with a sound determination feature, according to embodiments. FIG. 3 depicts a workflow 300 for moving a landing marker associated with the sound determination features described herein. FIG. 3 includes a UAV 302 with an associated first sound sensor 304 capturing first sound information 306 and transmitting the first sound information, via networks 308, to service provider computers 310. The first sound information 306 may be continuously captured by the first sound sensor 304, periodically upon approach to delivery location 312, or upon arrival at delivery location 312 as described herein. In FIG. 3, the delivery location 312 may include a landing marker 314 with an associated second sound sensor 316. In embodiments, the second sound sensor 316 may be configured to capture second sound information 318 and transmit the second sound information 318 to the service provider computers 310 via networks 308. The second sound sensor 316 may capture or record the sound generated by UAV 302 during flight and delivery 320 of a payload to delivery location 312. The second sound sensor 316 may be configured to capture sound information within a certain distance of the second sound sensor 316 such as sounds from entities, objects, or the surrounding environment within delivery location 312.

FIG. 3 illustrates the landing marker 314 in a first position within the delivery location 312. In accordance with at least one embodiment, the first and second sound information 322 may be transferred to the service provider computers 310 and utilized to calculate a sound map 324 for the UAV 302 and/or the delivery location 312. In embodiments, the calculated sound map 324 may identify the sound power levels, sound characteristics, or sound pressure levels received at one or more distances from the UAV 302 during flight and delivery of a payload. In some embodiments, the service provider computers 310 may compare the metrics and calculated sound power levels to one or more sound regulations, thresholds, or preferences at 326. In accordance with at least one embodiment, to adhere to the sound regulations, thresholds, or preferences, the service provider computers 310 may generate and transmit instructions to move 328 the landing marker 314 to a second position or location 330 within the delivery location 312. For example, the service provider computers 310 may transmit the instructions to move 328 the landing marker 314 to the second position 330 to a user device 332 of a user 334 associated with delivery location 312. In response to receiving the instructions, the user 334 may move 336 the landing marker 314 from the first position to the second position 330 within delivery location. The movement 336 of the landing marker 314 may enable the UAV 302 to adhere to sound regulations or preferences by moving a certain distance away from an object, neighbor, or other location and thus alter the sound received or heard at a certain distance from the UAV 302 during flight.

Figure 4:
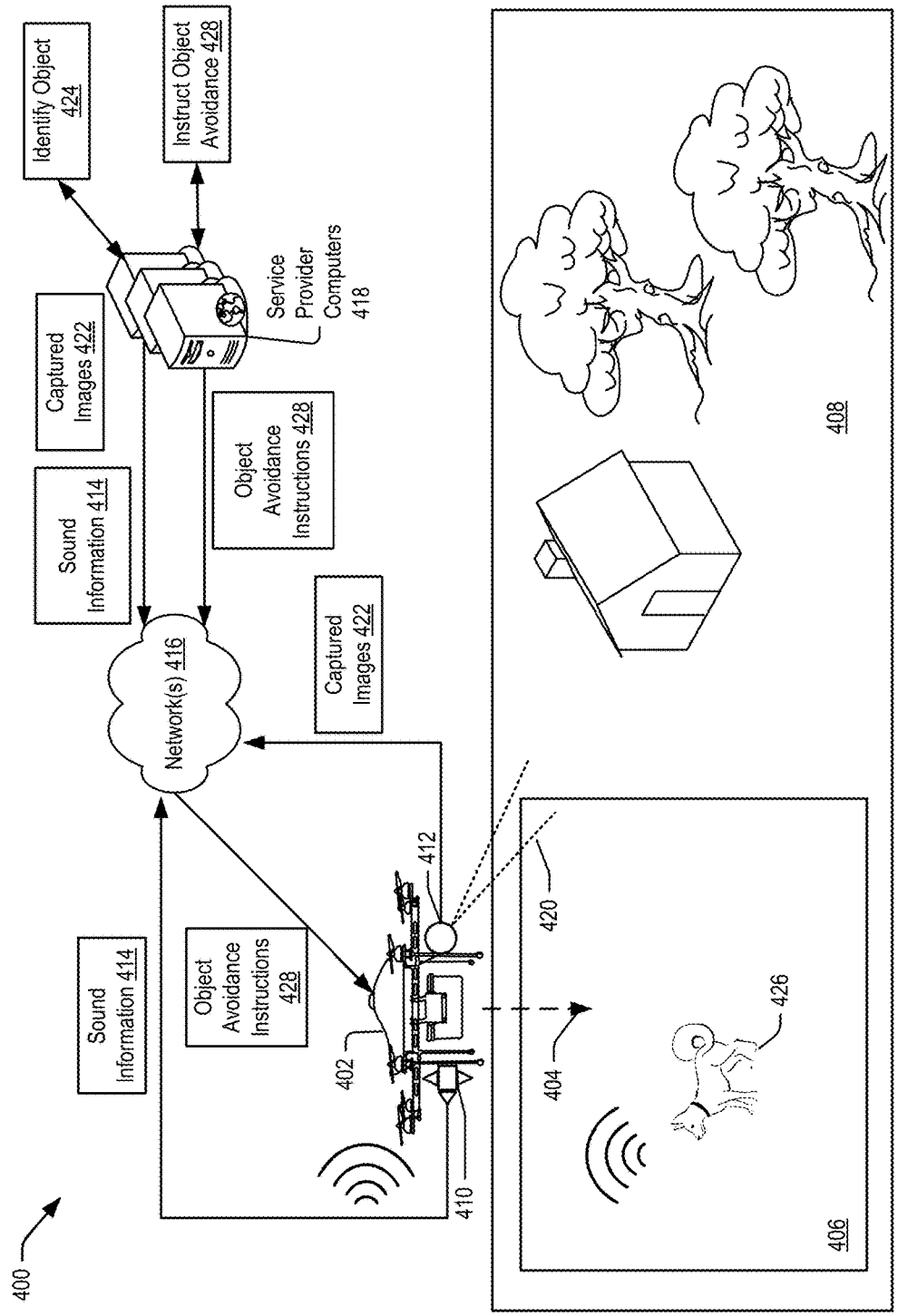
FIG. 4 illustrates an example workflow for a sound determination feature, according to embodiments.

FIG. 4 illustrates an example workflow 400 for a sound determination feature, according to embodiments. The workflow 400 includes a UAV 402 attempting to deliver 404 a payload to a landing marker 406 of a delivery location 408. In accordance with at least one embodiment, the UAV 402 may be configured to utilize a sound sensor 410 and an image sensor 412. In embodiments, the sound sensor 410 may be configured to obtain or capture sound information 414 about the sound generated by the UAV 402 and transmit the sound information 414, via networks 416, to service provider computers 418. The image sensor 412 may be configured to capture images, video feeds, video, or live media streams 420 of an area within a certain distance of UAV 412. For example, FIG. 4 illustrates the video sensor 412 capturing images of the delivery location 408. In embodiments, the image sensor 412 may be configured to transmit the captured images 422, via networks 416, to service provider computers 418.

In accordance with at least one embodiment, the captured images 422 from the image sensor 412 may be utilized by the service provider computers 418 to supplement the sound map generation. The service provider computers 418 may utilize the captured images 422 and sound information 414 to identify an object 424 within the landing marker 406 or delivery location 408 that may need to be avoided to successfully deliver the payload or to avoid a collision. For example, the captured images 422 may reveal that no objects or entities are present within the view of the image sensor 412. However, the sound information 414 from sound sensor 410 may identify the sound of an entity such as a person or dog 426. Upon identifying an object 424, the service provider computers 418 may generate and transmit instructions for object avoidance 428 to the UAV 402. The object avoidance instructions 428 may be utilized by the UAV 402 to avoid an object and still deliver 404 the payload to delivery location 408 and landing marker 406, to avoid colliding with an object or entity, such as the dog 426, or to instruct to a user associated with delivery location 408 to remove the offending object or entity from the delivery location to allow for successful delivery 404. In embodiments, the service provider computers 418 may utilize the sound information 414 and suitable object detection algorithms to identify objects within the delivery location 408 or to supplement the sound map for delivery location 408 and UAV 402 with the captured images 422 to account for intervening objects or entities that may alter the sound received or heard at different distances from UAV 402.

As described herein, the service provider computers 418 may utilize machine learning algorithms or systems to generate the sound maps and extract sound metrics from sound information provided by sound sensors. The machine learning system may be fully trained using a substantial corpus of observed environmental signals e(t) correlated with measured, captured, or obtained sounds that are obtained using each of the sensors of one or more UAVs during flight to develop sound models for each UAV and/or location during flight. After the machine learning system has been trained, and the sound maps calculated, the machine learning system may be provided with a set of extrinsic or intrinsic information or data (e.g., environmental conditions, operational characteristics, or positions) that may be anticipated in an environment in which a UAV is operating or expected to operate and the machine learning system will update or alter the sound maps appropriately to reflect the predicted sounds received at various distances from the UAV. In some implementations, the machine learning system may reside and/or be operated on one or more computing devices or machines provided onboard one or more of the UAVs. The machine learning system may receive information or data regarding the corpus of sound signals observed and the sounds measured by sensors of other UAVs (not pictured), for training purposes and, once trained, the machine learning system may receive extrinsic or intrinsic information or data that is actually observed by the UAV, e.g., in real time or in near-real time, as inputs and may generate outputs corresponding to predicted sounds based on the information or data. In embodiments, the sound maps for a UAV, such as UAV 402 and delivery location 408 may be dynamically updated as sound information 414 and/or captured images 422 are provided to the service provider computers 418.

Figure 5:
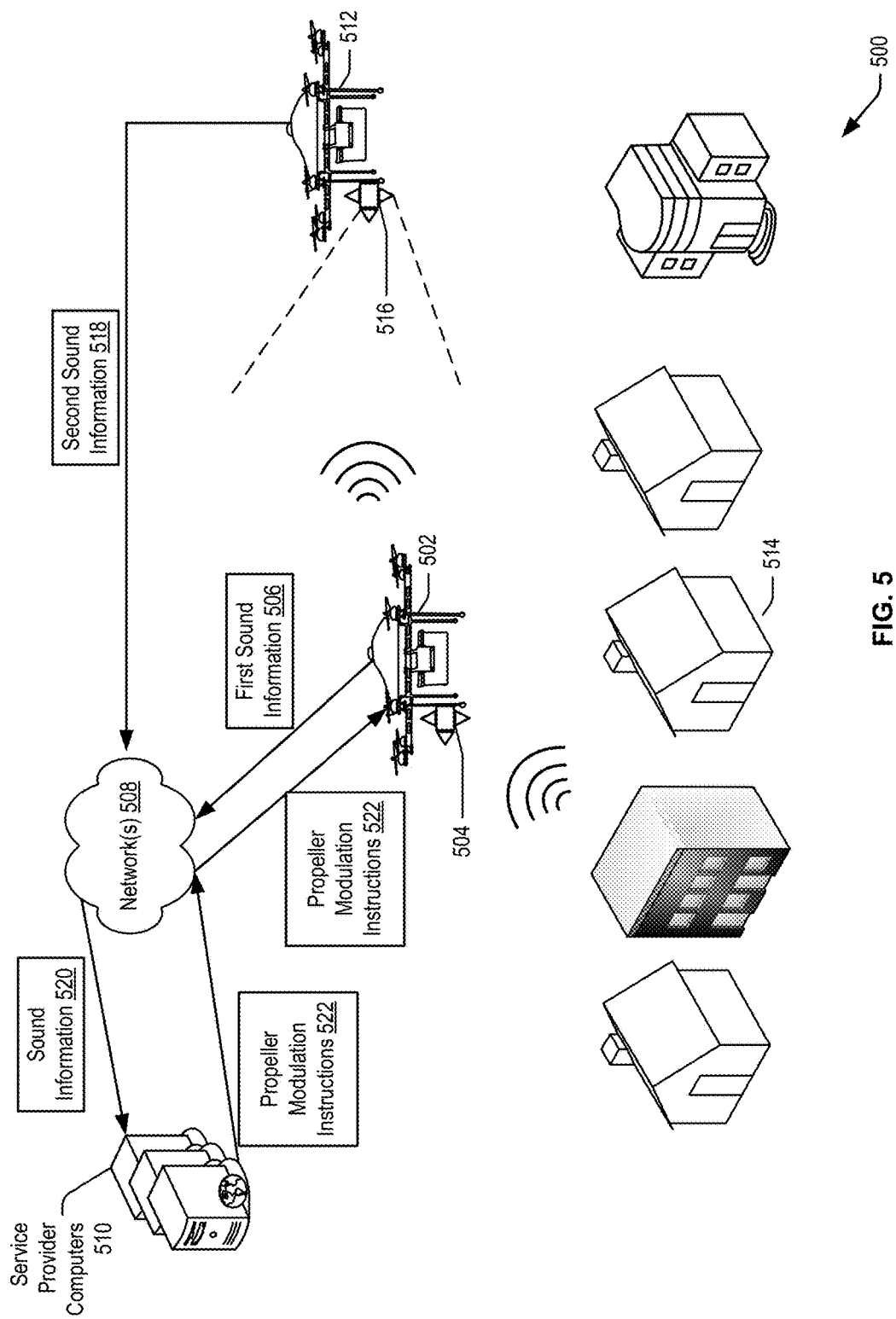
FIG. 5 illustrates an example workflow for a sound determination feature, according to embodiments.
Figure 6:
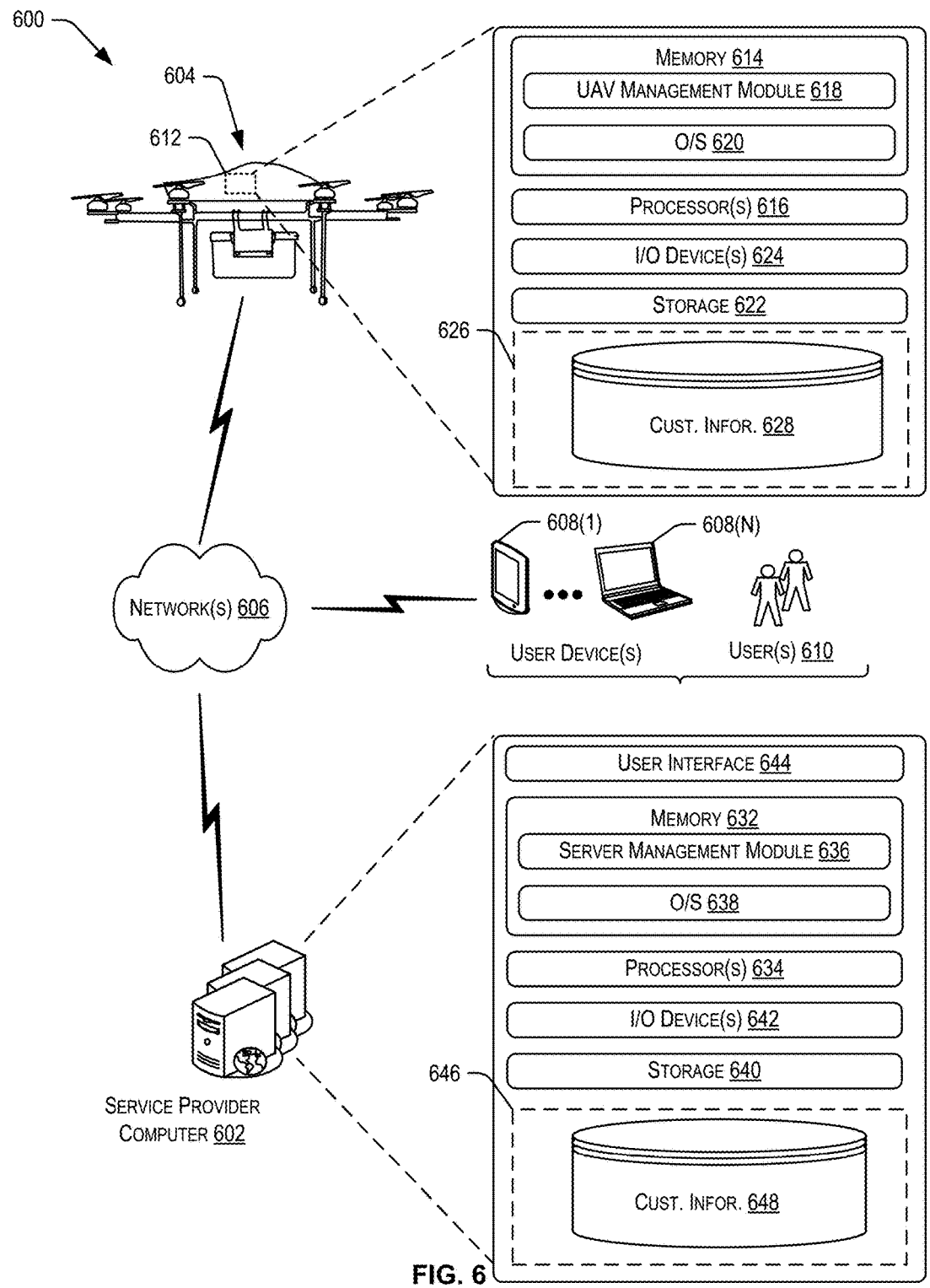
FIG. 6 illustrates an example computing architecture for implementing a sound determination feature, according to embodiments.

Turning to FIGS. 5 and 6, the figures FIGS. 5 and 6 illustrate example flows 500 and 600 for reducing and/or altering sound while delivering an item, according to embodiments. In the illustrative operations, some of the operations or functions may be embodied in, and fully or partially automated by, a management component (e.g., the management component 202 of FIG. 2). Nevertheless, other or a combination of other electronic and/or mechanical components may be additionally or alternatively used. Also, while the operations are illustrated in a particular order, it should be understood that no particular order is necessary and that one or more operations may be omitted, skipped, and/or reordered.

The example flow 500 of FIG. 5 may start at operation 502, where an order for an item may be received. For example, the order may be received at a network-based resource associated with an electronic marketplace. The electronic marketplace may offer the item. The order may be received from a computing device of a user accessing the network-based resource. At operation 504, a flight plan or instructions for delivering the item to a destination may be generated for the UAV. The received order may be processed to generate a mission and/or flight plan. The mission/flight plan may specify a delivery location and/or a delivery surface associated with the user and, as applicable, data associated with an expected environment at the delivery location and/or delivery surface. The mission may be provided to a UAV to cause a deployment thereof. For instance, data about the mission may be transmitted to a management component of the UAV.

At operation 506, one or more sound profiles are generated based in part on one or more sets of propellers of different sizes that are associated or configured on the UAV. In some embodiments, the one or more sound profiles identify an expected generated sound from the UAV based on utilizing a particular configuration of propellers of different sizes. In embodiments, the one or more sound profiles identify an expected generated sound from the UAV based on different treatments, angles, or other dressings of the propellers of different sizes. The UAV may autonomously or semi-autonomously execute the mission or portions thereof including, for example, flying to the delivery location, delivering the package including the item, and returning to a home base. In an autonomous execution, the management component of the UAV may manage and control the execution of the portions of the mission including modulating between propellers of different sizes to reduce and/or alter the sound generated by the UAV. In a semi-autonomous execution, the management component may do so in coordination or under the instructions of another management component. This other component may be a ground component in remote communication with the UAV's management component.

At operation 508, the UAV may be instructed to modulate from one set of propellers of a first size to a second set of propellers of a second size during at least a portion of the flight plan (delivery path to the delivery location) to reduce and/or alter the sound generated by the UAV. In embodiments, a relative location or a determination of a stage of the flight plan may be utilized as a data point in determining the modulation between propellers of different sizes that are associated with the UAV to reduce and/or alter the sound generated by the UAV. This determination may be based on current location data of the UAV (e.g., GPS coordinates) and based on comparing this location data to that of the delivery location.

Arriving to the delivery location may include arriving at the exact delivery location or to a vicinity of the delivery location. Once at the delivery location, the UAV may sense, as applicable, various environmental data to determine or update the sound profile and thereby update which particular sets of propellers to utilize to generate an expected sound according to a sound profile. The UAV may deliver the item and modulate to yet another set of propellers of a different size for a return trip to the facility or origin location. In some embodiments, multiple sets of propellers of different sizes may be utilized in one or more configurations to reduce and/or alter the sound generated by the UAV at different locations of the UAV during the delivery (e.g., an expected sound during transit at a certain altitude as opposed to another expected sound during delivery at the delivery location). Based on expected or detected environment conditions around the delivery location as well as intrinsic data, the UAV may perform different maneuvers and utilize one or more configurations of different sized propellers to complete delivery of the item to a delivery location.

The example flow 600 of FIG. 6 may start at operation 602, where an order for an item may be received. For example, the order may be received at a network-based resource associated with an electronic marketplace. At operation 604, a flight plan or instructions for delivering the item to a destination may be generated for the UAV. The received order may be processed to generate a mission and/or flight plan. The mission/flight plan may specify a delivery location and/or a delivery surface associated with the user and, as applicable, data associated with an expected environment at the delivery location and/or delivery surface. At operation 606, a first sound generated around the UAV may be received from a first sensor associated with the UAV based on the UAV utilizing a first set of propellers of a first size. In embodiments, the UAV may be outfitted or configured to utilize a plurality of sets of propellers of different sizes.

At operation 608, a sound profile may be dynamically generated for the UAV based in part on the first sound. The sound profile may identify an expected sound that corresponds to utilizing a particular set of propellers of a certain size during flight. In embodiments, other data such as environment data may be used in conjunction with the data from the first sensor to generate the sound profile for the UAV. In some embodiments, the metrics included in the generated sound profile may be compared to a threshold to determine whether any particular metric or metrics exceed a threshold associated with the stage of the flight plan. For example, during transit (i.e., between the origin location and the delivery location) one or more thresholds may be specified to tolerate higher metric values included in the sound profile. In comparison, during landing the thresholds may be specified to be restrictive and thereby reduce and/or alter the sound generated by the UAV. At operation 610, the UAV may be instructed or receive instructions to modulate from the first set of propellers of the first size to a second set of propellers of a second size based on the sound profile and a relative location of the UAV during delivery of the item. As described herein, the sound profile generated may indicate that the UAV's current configuration or utilization of propellers of a first size is generated sound that should be reduced or altered. As such, the instructions may modulate the UAV to utilize other sets of propellers of a different size to reduce or alter the generated noise. The selection of the particular sets of propellers of different sizes may be determined based on the dynamically generated sound profiles that identify an expected sound when utilizing a particular set of propellers of different size from the currently utilized sets of propellers.

FIG. 5 illustrates an example workflow 500 for a sound determination feature, according to embodiments. The workflow 500 of FIG. 5 includes a first UAV 502 in flight and in transition to deliver a payload to a delivery location. The first UAV 502 may include an associated first sound sensor 504 that is configured to capture first sound information 506 about the sounds generated by the first UAV 502 in flight. The first UAV 502 may transmit the first sound information 506, via networks 508, to service provider computers 510. In accordance with at least one embodiment and as FIG. 5 depicts, another UAV, second UAV 512 may also be flying or in transit to deliver a payload to a location such as delivery location 514. In embodiments, the second UAV 512 may include its own sound sensor, second sound sensor 516. The second sound sensor 516 may be configured to capture or obtain sound information for the UAV 512 during flight and/or second sound information 518 about the sound generated by first UAV 502 during flight. The second UAV 512 may be configured to transmit the second sound information 518 to service provider computers 510 via networks 508.

In accordance with at least one embodiment, the service provider computers 510 may use the sound information 520 from the first UAV 502 and second UAV 512 to extract sound metrics for the sound generated by first UAV 502. In embodiments, the service provider computers 510 may calculate a sound map for UAV 502 during flight of UAV 502. As described herein, the service provider computer may compare the sound map to one or more regulations, thresholds, and/or preferences to determine that the first UAV 502 is generate a sound or sounds that violate said regulations, thresholds, and/or preferences. The service provider computers 510 may generate and transmit propeller modulation instructions 522 to the first UAV 502 that result, when implemented by the first UAV 502, in altering the sound generated by the first UAV 502 to adhere to the sound regulations, thresholds, or user preferences. The first UAV 502 may implement and receive various propeller modulation instructions 522 based on its current location, altitude, or proximity to an intended delivery location to adhere to the sound regulations, thresholds, and user preferences.

FIG. 6 illustrates an environment in which various embodiments can be implemented. The architecture 600 may include a service provider computer 602 (which may be an example of service provider computer(s) 110, 310, 418, or 510). The service provider computer 602 may be included as part of an electronic marketplace (not shown) and interface with purchase and delivery services of the electronic marketplace. In this manner, the service provider computer 602 may coordinate delivery of items via UAVs, such as UAV 604, to customers of the electronic marketplace. The UAV 604 is an example of the UAV 200 discussed previously in FIG. 2. In some examples, the service provider computer 602 may be a stand-alone service operated on its own or in connection with an electronic marketplace. In either example, the service provider computer 602 may be in communication with the UAV 604 via one or more network(s) 606 (hereinafter, "the network 606"). The network 606 may include any one or a combination of many different types of networks, such as cable networks, the Internet, wireless networks, cellular networks, radio networks, and other private and/or public networks. Thus, the service provider computer 602 may be configured to provide back-end control of the UAV 604 prior to, during, and after completion of its delivery plan. As discussed previously, in some examples, the UAV 604 may be configured to accomplish its delivery plan (e.g., deliver its payload) with little to no communication with the service provider computer 602.

User devices 608(1)-608(N) (hereinafter, "the user device 608") may also be in communication with the service provider computer 602 and the UAV 604 via the network 606. The user device 608 may be operable by one or more human users 610 (hereinafter, "the human user 610") to access and/or communicate with the service provider computer 602 (or an electronic marketplace) and the UAV 604 via the network 606. In some examples, such connectivity may enable the human user 610 to interact and/or communicate with the UAV 604 according to techniques described herein. The user device 608 may be any suitable device capable of communicating with the network 606. For example, the user device 608 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 608 may be in communication with the service provider computer 602 via one or more web servers constituting an electronic marketplace (not shown) connected to the network 606 and associated with the service provider computer 602.

Turning now to the details of the UAV 604, the UAV 604 may include an onboard computer 612 including at least one memory 614 and one or more processing units (or processor(s)) 616. The processor(s) 616 may be implemented as appropriate in hardware, computer-executable instructions, software, firmware, or combinations thereof. Computer-executable instruction, software or firmware implementations of the processor(s) 616 may include computer-executable or machine-executable instructions written in any suitable programming language to perform the various functions described. The memory 614 may include more than one memory and may be distributed throughout the onboard computer 612. The memory 614 may store program instructions (e.g., UAV management module 618) that are loadable and executable on the processor(s) 616, as well as data generated during the execution of these programs. Depending on the configuration and type of memory including the UAV management module 618, the memory 614 may be volatile (such as random access memory (RAM)) and/or non-volatile (such as read-only memory (ROM), flash memory, or other memory). The UAV management module 618 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 614 may include multiple different types of memory, such as static random access memory (SRAM), dynamic random access memory (DRAM), or ROM. Turning to the contents of the memory 614 in more detail, the memory 614 may include an operating system 620 and one or more application programs, modules or services for implementing the features disclosed herein including at least the UAV management module 618. In embodiments, the UAV management module 618 may be configured to obtain (via associated sound sensors or sensors (not pictured) or receive sound information that includes sounds generated by the UAV 604 during flight, extract sound metrics for the sound generated by the UAV 604, determine one or more sound power levels received for different distances from the UAV 604, generate a sound map for the sound generated by the UAV 604 or for a particular location such as a delivery location, communicate with a user (customer 810) about moving an object from a landing zone, moving a landing marker to a different area of a delivery location to generate a new landing zone, verify flight paths/plans for the UAV 804, or communicate with other UAVs concerning sound generated by said UAVs or for obstacle avoidance purposes.

In some examples, the onboard computer 612 may also include additional storage 622, which may include removable storage and/or non-removable storage. The additional storage 622 may include, but is not limited to, magnetic storage, optical disks, and/or tape storage. The disk drives and their associated computer-readable media may provide non-volatile storage of computer-readable instructions, data structures, program modules, and other data for the computing devices.

The memory 614 and the additional storage 622, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 612. The modules of the onboard computer 612 may include one or more components. The onboard computer 612 may also include input/output (I/O) device(s) and/or ports 624, such as for enabling connection with a keyboard, a mouse, a pen, a voice input device, a touch input device, a display, speakers, a sound sensor, a printer, or other I/O device. The I/O device(s) 624 may enable communication with the other systems of the UAV 804 (e.g., other parts of the control system, power system, communication system, navigation system, propulsion system, and the retaining system) or with other UAVs or external components.

The onboard computer 612 may also include data store 626. The data store 626 may include one or more databases, data structures, or the like for storing and/or retaining information associated with the UAV 604. In some examples, the data store 626 may include databases, such as customer information database 628. Within the customer information database 628 may be stored any suitable customer information that may be used by the UAV 604 in implementing and/or affecting its delivery plan. For example, the customer information database 628 may include profile characteristics for the human user 610. The profile characteristics may include a shipping address, images captured by UAV 604 for a delivery location or area associated with the customer 610, a sound map generated for the customer's 610 delivery location, and/or sound regulations or thresholds associated with a flight path to the delivery location or that correspond to the customer's 610 sound preferences.

Turning now to the details of the user device 608. The user device 608 may be used by the human user 610 for interacting with the service provider computer 602 and, in some cases, the UAV 604. The user device 608 may therefore include a memory, a processor, a user-interface, a web-service application, and any other suitable feature to enable communication with the features of architecture 600. The web service application may be in the form of a web browser, an application programming interface (API), virtual computing instance, or other suitable application. In some examples, when the service provider computer 602 is part of, or shares an association with, an electronic marketplace, the user device 608 may be used by the human user 610 for procuring one or more items from the electronic marketplace. The human user 610 may request delivery of the purchased item(s) using the UAV 604, or the service provider computer 602 may coordinate such delivery on its own. In some examples, the human user 610 may use the user device 608 to obtain or capture sound generated by UAV 604 during flight and/or delivery of an item to a location associated with the human user 610. The human user 610 may receive instructions from the service provider computer 602 and/or UAV 604 to move a landing marker or to move objects in a landing zone to enable safe delivery of an item.

Turning now to the details of the service provider computer 602, the service provider computer 602 may include one or more service provider computers, perhaps arranged in a cluster of servers or as a server farm, and may host web service applications. These servers may be configured to host a website (or combination of websites) viewable via the user device 608. The service provider computer 602 may include at least one memory 632 and one or more processing units (or processor(s)) 634. The processor(s) 634 may be implemented as appropriate in hardware, computer-executable instructions, software, firmware, or combinations thereof. Computer-executable instruction, software or firmware implementations of the processor(s) 634 may include computer-executable or machine-executable instructions written in any suitable programming language to perform the various functions described. The memory 632 may include more than one memory and may be distributed throughout the service provider computer 602. The memory 632 may store program instructions (e.g., server management module 636) that are loadable and executable on the processor(s) 634, as well as data generated during the execution of these programs. Depending on the configuration and type of memory including the server management module 636, the memory 632 may be volatile (such as random access memory (RAM)) and/or non-volatile (such as read-only memory (ROM), flash memory, or other memory). The service provider computer 602 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 632 may include multiple different types of memory, such as static random access memory (SRAM), dynamic random access memory (DRAM), or ROM. Turning to the contents of the memory 632 in more detail, the memory 632 may include an operating system 638 and one or more application programs, modules or services for implementing the features disclosed herein including at least the server management module 636. The server management module 636, in some examples, may function similarly to the UAV management module 618. For example, when the UAV 604 is in network communication with the service provider computer 602, the UAV 604 may receive at least some instructions from the service provider computer 602 as the server management module 636 is executed by the processors 634. In some examples, the UAV 604 executes the UAV management module 618 to operate independent of the service provider computer 602. The server management module 636 and UAV management module 618 may be an example of management system 202 of FIG. 2.

In some examples, the service provider computer 602 may also include additional storage 640, which may include removable storage and/or non-removable storage. The additional storage 640 may include, but is not limited to, magnetic storage, optical disks, and/or tape storage. The disk drives and their associated computer-readable media may provide non-volatile storage of computer-readable instructions, data structures, program modules, and other data for the computing devices.

The memory 632 and the additional storage 640, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer 602. The modules of the service provider computer 602 may include one or more components. The service provider computer 602 may also include input/output (I/O) device(s) and/or ports 642, such as for enabling connection with a keyboard, a mouse, a pen, a voice input device, a touch input device, a display, speakers, a printer, or other I/O device.

In some examples, the service provider computer 602 may include a user interface 644. The user interface 644 may be utilized by an operator, or other authorized user to access portions of the service provider computer 602. In some examples, the user interface 644 may include a graphical user interface, web-based applications, programmatic interfaces such as application programming interfaces (APIs), or other user interface configurations. The service provider computer 602 may also include data store 646. The data store 646 may include one or more databases, data structures, or the like for storing and/or retaining information associated with the service provider computer 602. The data store 646 may include databases, such as customer information database 648. The customer information database 648 may include similar information as the customer information database 628. The service provider computer 602 may store a larger amount of information in the data store 646 than the onboard computer 612 is capable of storing in the data store 626. Thus, in some examples, at least a portion of the information from the databases in the data store 646 is copied to the databases of the data store 626, e.g., periodically, occasionally, in connection with an event, or otherwise, or the data store 628 is copied to the databases of the data store 646. In this manner, the data store 626 may have up-to-date information, without having to maintain the databases. In some examples, this information may be transferred as part of a delivery plan prior to the UAV 604 beginning a delivery mission.

Figure 7:
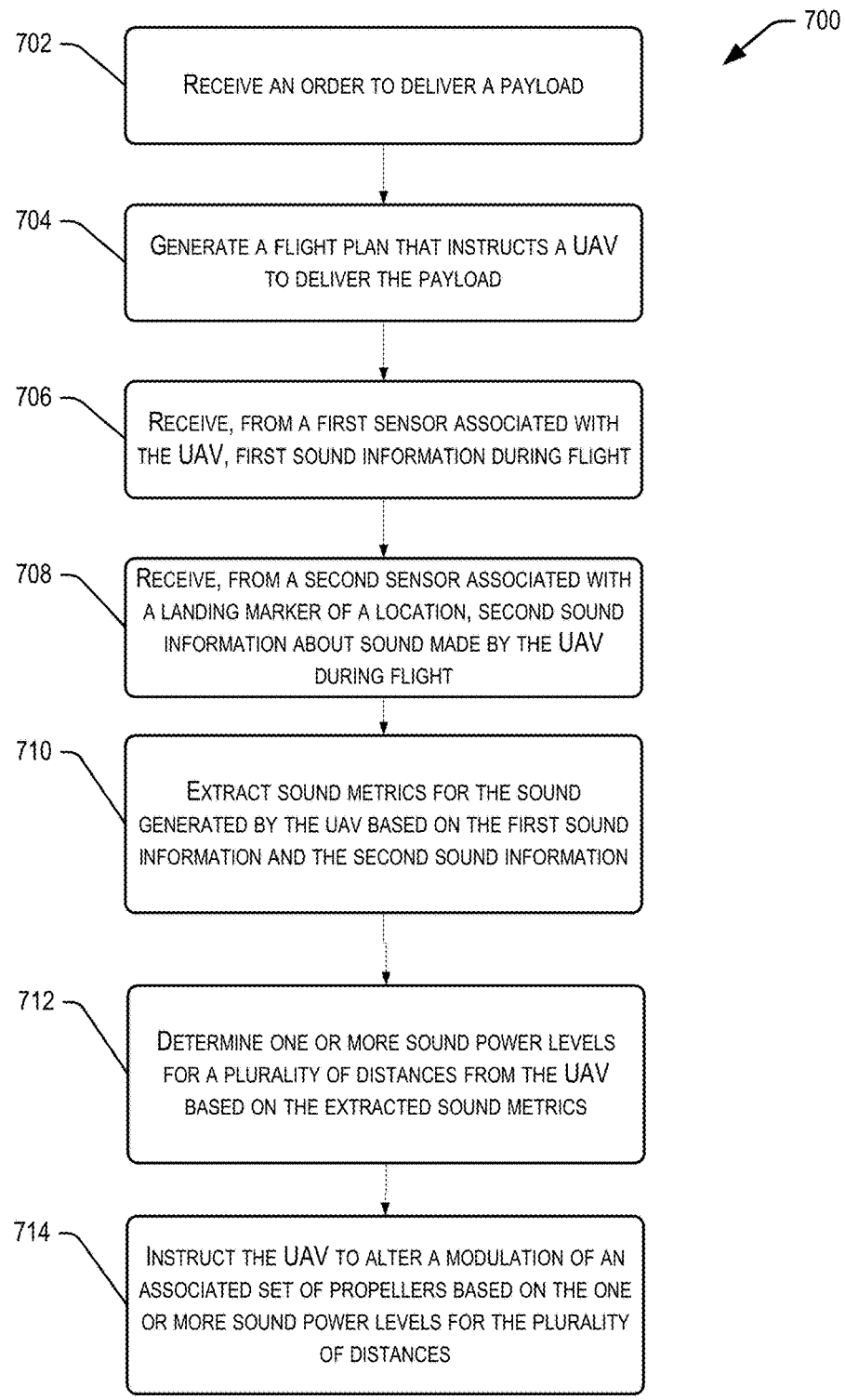
FIG. 7 illustrates an example flow for a sound determination feature, according to embodiments.
Figure 8:
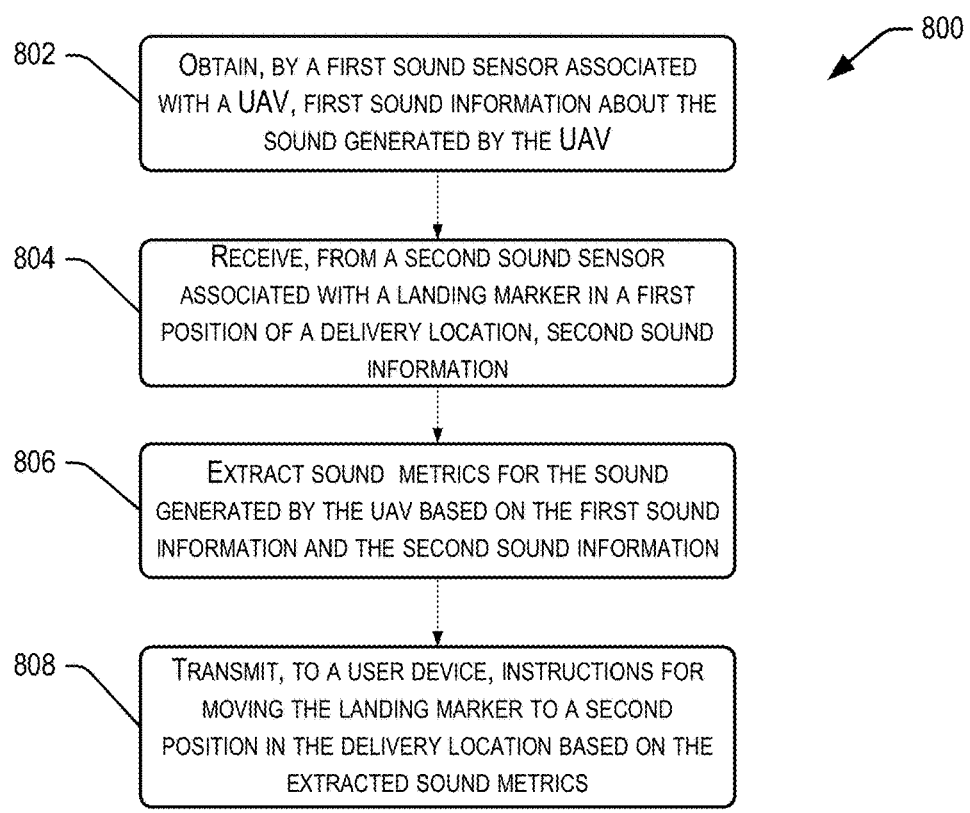
FIG. 8 illustrates an example flow for a sound determination feature, according to embodiments.

Turning to FIGS. 7 and 8, the figures FIGS. 7 and 8 illustrate example flows 700 and 800 for a sound determination feature, according to embodiments. In the illustrative operations, some of the operations or functions may be embodied in, and fully or partially automated by, a management component (e.g., the management component 202 of FIG. 2). Nevertheless, other or a combination of other electronic and/or mechanical components may be additionally or alternatively used. Also, while the operations are illustrated in a particular order, it should be understood that no particular order is necessary and that one or more operations may be omitted, skipped, and/or reordered.

FIG. 7 may start at operation 702, by receiving an order to deliver a payload. For example, an electronic marketplace associated with service provider computers implementing the sound determination feature may receive an order to deliver an item to a user's home or delivery location. In response, instructions may be generated and transmitted to enable a UAV to deliver said item to the user's home. At operation 704, the service provider computers may generate a flight plan that instructs a UV to deliver the payload. At operation 706, the service provider computers may receive, from a first sensor associated with the UAV, first sound information. In embodiments, the first sound information may be obtained by the first sensor associated with the UAV and may include the sound generated by the UAV during flight. In some embodiments, the first sensor may continually record or obtain the first sound information as the UAV flies to deliver the payload. In embodiments, the first sensor may periodically record or capture the first sound information about the sound generated by the UAV during flight or may record/capture the sound in response to receiving a signal from the service provider computers. For example, geo-location information for the UAV may be transmitted to the service provider computers and compared to the geo-location information for the delivery location. Upon proximity to the delivery location by the UAV as determined by the corresponding geo-location information the service provider computers may provide instructions that enable the first sound sensor to begin recording or capturing the first sound information.

At operation 708, the service provider computers may receive, from a second sensor associated with a landing marker of the delivery location, second sound information. The second sound information may include the sound generated by the UAV during flight and delivery of the payload to the delivery location. In embodiments, the landing marker may be utilized to guide the UAV to deliver the payload to the delivery location. In some embodiments, the second sensor associated with the landing marker may obtain, record, or capture the second sound information periodically (i.e., in response to a signal provided by the UAV upon approach to the delivery location) or continuously. At operation 710, the service provider computers may extract sound metrics for the sound generated by the UAV based at least in part on the first sound information and the second sound information. For example, the service provider computer may utilize one or more machine learning algorithms to extract the sound metrics for the sound generated by the UAV during flight as derived from the first and second sound information captured by the first and second sensors. In embodiments, the sound metrics may include a sound power level for the sound, a decibel level for the sound, a loudness level for the sound, a sharpness level for the sound, a roughness level for the sound, a tonal prominence level for the sound, or a fluctuation strength of the sound generated by the UAV during flight.

At operation 712, the service provider computers may determine one or more sound power levels for a plurality of distances from the UAV based on the extracted sound metrics. In embodiments, the service provider computers may utilize one or more algorithms or machine learning algorithms to calculate and determine a predicted sound power level or sound received/heard at different distances from the UAV using the extracted sound metrics. For example, the service provider computers may utilize the sound generated by the UAV, as captured by the first and second sensors, to calculate a predicted sound heard or received by a user, person, or human entity at various distances from the UAV. As an example, the extracted sound metrics or sound information for the sound generated by the UAV may be utilized to calculate a sound power level or sound heard/received by a customer at the delivery location at 25 feet from the UAV, for a neighbor of the delivery location at 50 feet from the UAV, or for a casual observer at 100 feet from the UAV. At operation 714 the service provider computers may generate and transmit instructions to the UAV that instruct the UAV to alter a modulation of associated set of propellers based on the one or more sound power levels for the different distances from the UAV. In embodiments, the alteration of the modulation results in a change in the sound generated by the UAV. In some embodiments, the instructions may include altering the rotational speed per minute of the associated set of propellers of the UAV, or the enabling or extension of different blade treatments from the sets of propellers which reduces, changes, or alters the sound generated by the UAV during flight. In accordance with at least one embodiment, instructions to modulate or alter the modulation of an associated set of propellers of a UAV may be based in part on sound regulations associated with UAVs, with a location, with a delivery location, or customer/user preferences that regulate or require sound generated by a UAV be at or below a certain level.

FIG. 8 may start at operation 802 by obtaining, by a first sound sensor associated with a UAV, first sound information about the sound generated by the UAV. In embodiments, a UAV may be configured to utilize a sound sensor that is capable of recording or capturing the sound generated by and around the UAV (i.e., extrinsic and intrinsic sounds). As described herein, the UAV may include a processor, memory, and data storage capable of performing operations for the sound determination feature described herein such as identifying sound metrics and determining a sound map or sound power levels for a plurality of distances from the UAV. In embodiments, a sound sensor and/or sensor may include any suitable microphone, miniature microphone, or sound capturing device that include components that are capable of capturing/recording acoustical properties such as particle velocity, sound power, and three dimensional sound. At operation 804, second sound information may be received from a second sound sensor associated with a landing marker. In embodiments, the landing marker may be positioned in a first position within a delivery location. In accordance with at least one embodiment, the second sound sensor may be configured to provide the second sound information to the UAV that is in proximity or on approach to deliver a payload to the delivery location or location associated with a user.

At operation 806, sound metrics for the sound generated by the UAV may be extracted based on the first sound information and the second sound information. In accordance with at least one embodiment, the sound metrics may be utilized to generate a sound map for the sound generated by the UAV and/or for the delivery location. The sound map may identify the sound received at various distances from the UAV based on the sound being generated by the UAV during flight. At operation 808, the UAV may generate and transmit, to a user device, instructions for moving the landing marker to a second position in the delivery location based on the extracted sound metrics. In embodiments, the UAV may generate and transmit instructions (i.e., communicate) with a user device of a user or a customer receiving a payload or item ordered from an electronic marketplace that is associated with the service provider computers. The instructions may include details such as which direction and how far to move the landing marker to transition from a first position to a second position within the delivery location. In accordance with at least one embodiment, the UAV may generate and transmit such instructions to move the landing marker to avoid violating one or more sound regulations, exceed sound thresholds specified or associated with a user, neighbor, or set by an administrator or other entity associated with the sound determination feature service described herein, or to adhere to preferences of the customer/user of the delivery location.

Figure 9:
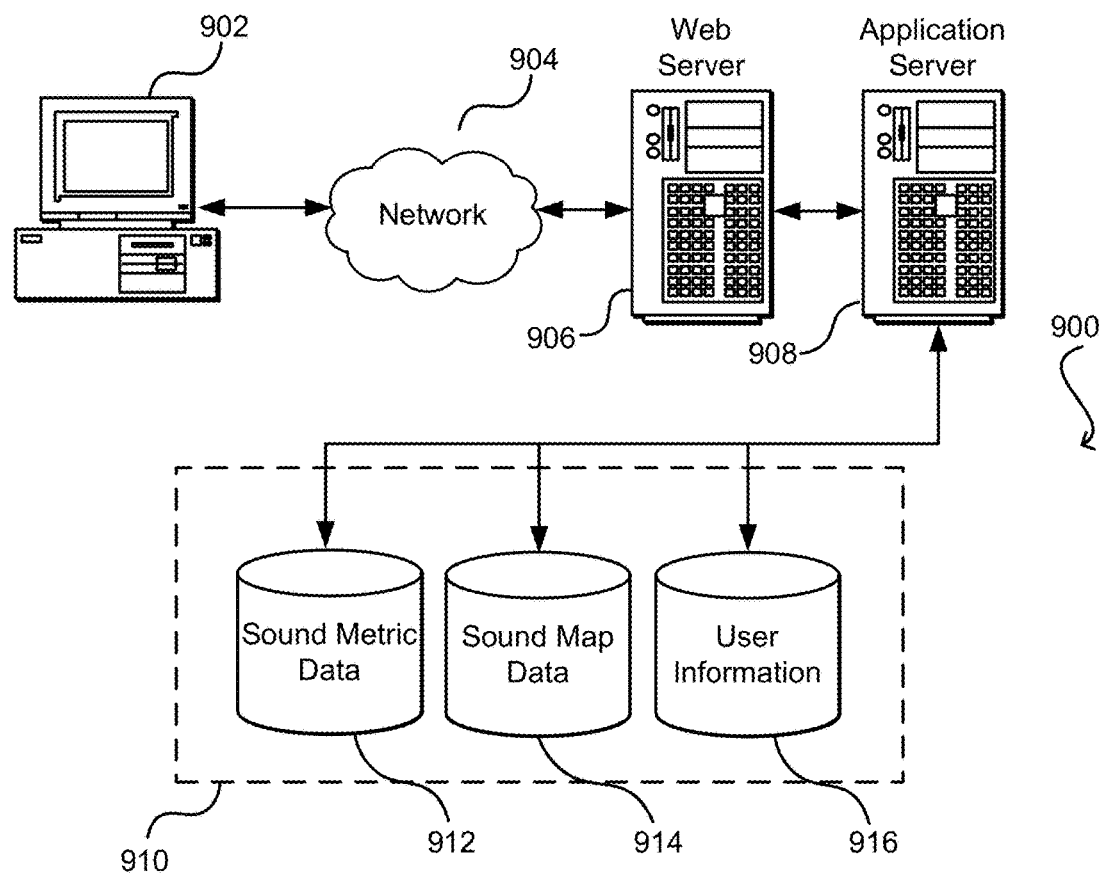
FIG. 9 illustrates an environment in which various embodiments can be implemented.

FIG. 9 illustrates an environment in which various embodiments can be implemented. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the UAV (via a client device) or to the UAV itself. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and/or UAV, handling a majority of the data access and logic for an application. The application server provides access control services in cooperation with the data store and is able to generate content such as text, graphics, audio and/or video to be transferred to the user, which may be served to the user by the Web server 1206 in the form of HyperText Markup Language ("HTML"), Extensible Markup Language ("XML"), another appropriate structured language in this example, or via an application and graphical user interface. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing information which can be used by modules described herein, such as sound metric data 912, sound map data 914, and/or user information 916. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, an order to deliver a payload;
   generating, by the computer system, a flight plan that instructs an unmanned aerial vehicle (UAV) to deliver the payload to a location based at least in part on information associated with the order;
   receiving, by the computer system, first sound information from a first sensor associated with the UAV, the first sensor configured to obtain sound generated by the UAV during flight;
   receiving, by the computer system, second sound information from a second sensor associated with a landing marker of the location, the second sensor configured to obtain the sound generated by the UAV during flight, the landing marker utilized to guide the UAV to deliver the payload;
   extracting, by the computer system, sound metrics for the sound generated by the UAV based at least in part on the first sound information and the second sound information;
   determining, by the computer system, one or more sound pressure levels for a plurality of distances from the UAV based at least in part on the extracted sound metrics, a sound pressure level of the one or more sound pressure levels identifying the sound received at a particular distance from the UAV during flight; and
   instructing, by the computer system, the UAV to alter a modulation of an associated set of propellers based at least in part on the one or more sound pressure levels for the plurality of distances thereby altering the sound generated by the UAV.

2. The computer-implemented method of claim 1, wherein receiving the second sound information is based at least in part on a signal received by the second sensor associated with the landing marker, the signal being provided by the UAV.

3. The computer-implemented method of claim 1, wherein receiving the first sound information from the first sensor associated with the UAV is based at least in part on a first geographic location for the UAV and a second geographic location for the location.

4. The computer-implemented method of claim 1, further comprising identifying a component failure of the UAV based at least in part on the first sound information and the second sound information.

5. The computer-implemented method of claim 1, further comprising:
  requesting, by the computer system and from a user device associated with the location, for third sound information obtained by the user device about the sound generated by the UAV; and
  updating, by the computer system, the sound metrics for the sound generated by the UAV based at least in part on the third sound information.

6. The computer-implemented method of claim 1, further comprising:
  receiving, by the computer system, environmental input within a certain distance of the UAV, the environmental input obtained by a third sensor associated with the UAV; and
  updating, by the computer system, the sound metrics for the sound generated by the UAV based at least in part on the environmental input.

7. The computer-implemented method of claim 1, wherein the UAV is configured to store the first sound information in a local data store and transmit the first sound information to the computer system upon arriving at an origination location.

8. A computer-implemented method, comprising:
  generating, by a computer system, a flight plan that instructs a first unmanned aerial vehicle (UAV) to land at a location;
  receiving, by the computer system, first sound information from a first sensor associated with the first UAV, the first sensor configured to obtain sound generated by the UAV during flight;
  receiving, by the computer system, second sound information from a second sensor associated with a second UAV, the second sound information transmitted by the second UAV to the computer system based at least in part on a certain distance between the first UAV and the second UAV during simultaneous flight of the first UAV and the second UAV;
  extracting, by the computer system, sound metrics for the sound generated by the first UAV based at least in part on the first sound information and the second sound information; and
  generating, by the computer system, a sound map for the location based at least in part on the extracted sound metrics, the sound map identifying sound parameters comprising transformations of the sound calculated for different distances from the first UAV.

9. The computer-implemented method of claim 8, wherein the sound metrics for the sound generated by the first UAV comprise one or more of a sound pressure level for the sound, a sound power level for the sound, a decibel level for the sound, a loudness level for the sound, a sharpness level for the sound, a roughness level for the sound, a tonal prominence for the sound, or a fluctuation strength of the sound.

10. The computer-implemented method of claim 8, wherein the sound map is generated further based at least in part on a machine learning algorithm utilizing the extracted sound metrics.

11. The computer-implemented method of claim 8, further comprising:
  configuring the first UAV to utilize a third sensor for obtaining object detection information; and
  updating, by the computer system, the object detection information utilizing the first sound information and the second sound information.

12. The computer-implemented method of claim 11, wherein the third sensor includes a time of flight sensor.

13. The computer-implemented method of claim 11, further comprising:
  generating, by the computer system, a new flight plan that instructs the first UAV to avoid an object, the object identified using the updated object detection information.

14. The computer-implemented method of claim 8, further comprising updating, by the computer system, the flight plan for the UAV for subsequent flights to the location, the flight plan updated based at least in part on the generated sound map.

15. An unmanned aerial vehicle (UAV), comprising:
  a frame;
  a set of propellers associated with a propulsion system associated with the frame, the set of propellers configured to provide propulsion for the UAV;
  a first sound sensor configured to obtain sound generated by the UAV during flight; and
  a computing system configured to manage the propulsion system during a flight associated with a transfer of a payload and further configured to:
    obtain, by the first sound sensor, first sound information about the sound generated by the UAV;
    receive, from a second sound sensor associated with a landing marker in a first position of a location for the UAV, second sound information;
    extract sound metrics for the sound generated by the UAV based at least in part on the first information and the second information; and
    transmit, to a user device, instructions for moving the landing marker to a second position of the location based at least in part on the extracted sound metrics.

16. The UAV of claim 15, wherein the computing system is further configured to maintain information that identifies a particular sound level for the location.

17. The UAV of claim 16, wherein the computing system is further configured to alter modulation of the set of propellers based at least in part on the extracted sound metrics and the information thereby altering the sound made by the UAV.

18. The UAV of claim 15, wherein the computing system is further configured to generate a sound map for the location based at least in part on the extracted sound metrics for the sound, the sound map identifying sound parameters comprising transformations of the sound calculated for different distances from the UAV.

19. The UAV of claim 18, wherein the instructions for moving the landing marker to a second position of the location is based at least in part on the generated sound map.

20. The UAV of claim 19, wherein the computing system is further configured to generate a flight plan for subsequent flights to the location based at least in part on the generated sound map.

* * * * *